US011961191B2

(12) United States Patent
Drummond et al.

(10) Patent No.: US 11,961,191 B2
(45) Date of Patent: Apr. 16, 2024

(54) PERCEPTUAL PROPERTY VECTOR FOR AN OBJECT

(71) Applicant: Apple Inc., Cupertino, CA (US)

(72) Inventors: Mark Drummond, Palo Alto, CA (US);
Bo Morgan, Emerald Hills, CA (US);
Siva Chandra Mouli Sivapurapu,
Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 88 days.

(21) Appl. No.: 17/465,320

(22) Filed: Sep. 2, 2021

(65) Prior Publication Data

US 2021/0398359 A1 Dec. 23, 2021

Related U.S. Application Data

(63) Continuation of application No. PCT/US2020/028963, filed on Apr. 20, 2020.
(Continued)

(51) Int. Cl.
*G06T 19/00* (2011.01)
*G06T 15/04* (2011.01)
(Continued)

(52) U.S. Cl.
CPC ............ *G06T 19/006* (2013.01); *G06T 15/04* (2013.01); *G06T 15/08* (2013.01); *G06V 20/41* (2022.01)

(58) Field of Classification Search
None
See application file for complete search history.

(56) References Cited

U.S. PATENT DOCUMENTS

2012/0179651 A1 7/2012 Marchese
2017/0309079 A1 10/2017 Naples et al.
(Continued)

FOREIGN PATENT DOCUMENTS

CN 104142995 A 11/2014
WO 2016130860 A2 8/2016

OTHER PUBLICATIONS

PCT International Search Report and Written Opinion dated Jul. 14, 2020, International Application No. PCT/US2020/028963, pp. 1-12.

*Primary Examiner* — Robert J Craddock
(74) *Attorney, Agent, or Firm* — Fernando & Partners, LLP

(57) ABSTRACT

In some implementations, a method includes obtaining a semantic construction of a physical environment. In some implementations, the semantic construction of the physical environment includes a representation of a physical element and a semantic label for the physical element. In some implementations, the method includes obtaining a graphical representation of the physical element. In some implementations, the method includes synthesizing a perceptual property vector (PPV) for the graphical representation of the physical element based on the semantic label for the physical element. In some implementations, the PPV includes one or more perceptual characteristic values characterizing the graphical representation of the physical element. In some implementations, the method includes compositing an affordance in association with the graphical representation of the physical element. In some implementations, the affordance allows interaction with the graphical representation of the physical element in accordance with the perceptual characteristic values included in the PPV.

25 Claims, 8 Drawing Sheets

Related U.S. Application Data

(60) Provisional application No. 62/837,285, filed on Apr. 23, 2019.

(51) Int. Cl.
*G06T 15/08* (2011.01)
*G06V 20/40* (2022.01)

(56) References Cited

U.S. PATENT DOCUMENTS

| | | |
|---|---|---|
| 2018/0074666 A1 | 3/2018 | Lee et al. |
| 2018/0365898 A1 | 12/2018 | Costa |

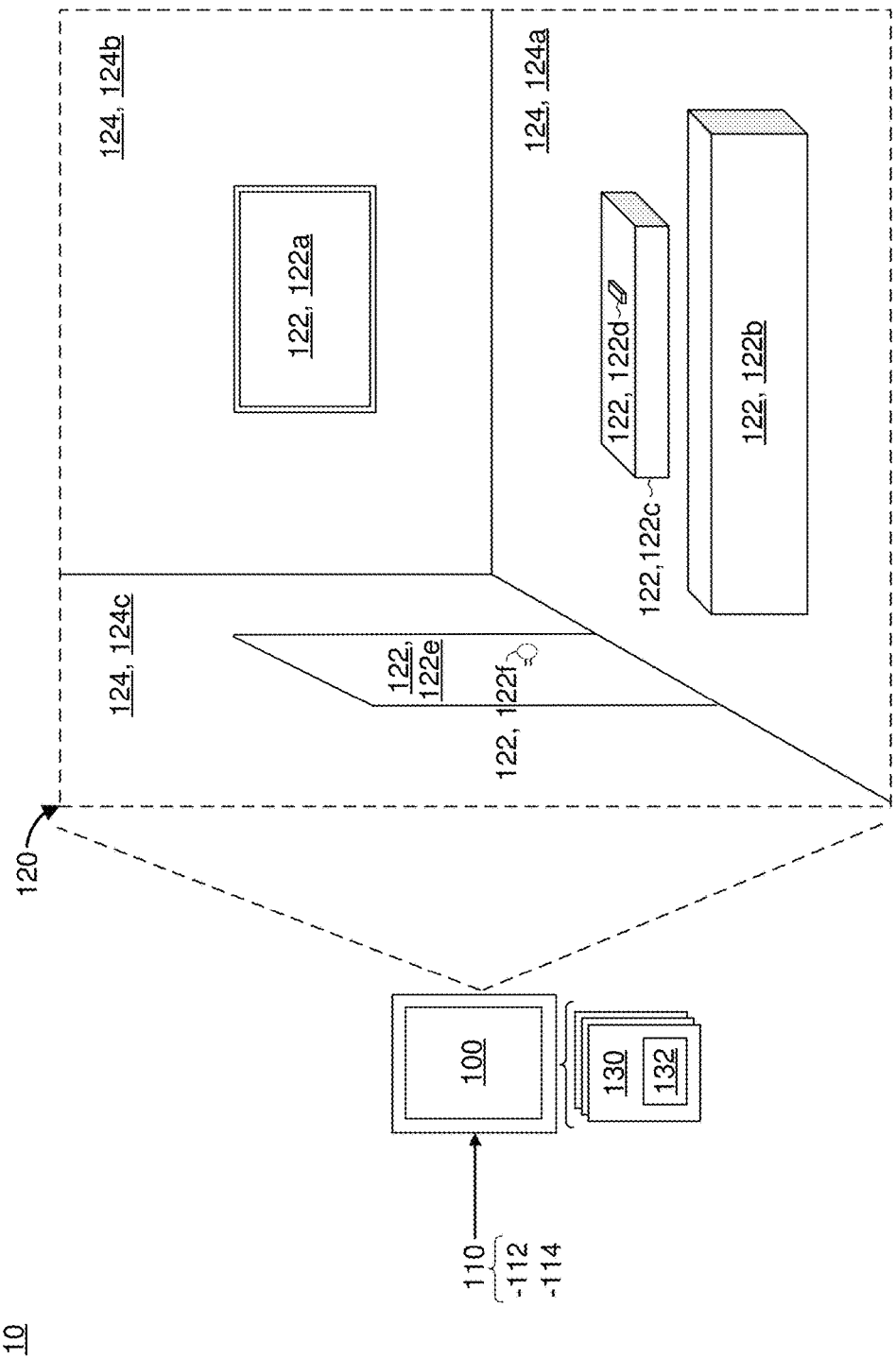

PERCEPTUAL PROPERTY VECTOR FOR AN OBJECT

CROSS-REFERENCE TO RELATED APPLICATION

This application is a continuation of Intl. Patent App. No. PCT/US2020/28963, filed on Apr. 20, 2020, which claims priority to U.S. Provisional Patent App. No. 62/837,285, filed on Apr. 23, 2019, which are both hereby incorporated by reference in their entirety.

TECHNICAL FIELD

The present disclosure generally relates to a perceptual property vector for an object.

BACKGROUND

Some devices are capable of generating and presenting environments. Some devices that present environments include mobile communication devices such as smartphones. Most previously available devices that present an environment are ineffective at allowing a user to interact with the environment.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1A-1D are diagrams illustrating generation of a perceptual property vector in accordance with some implementations.

Figure 1A:
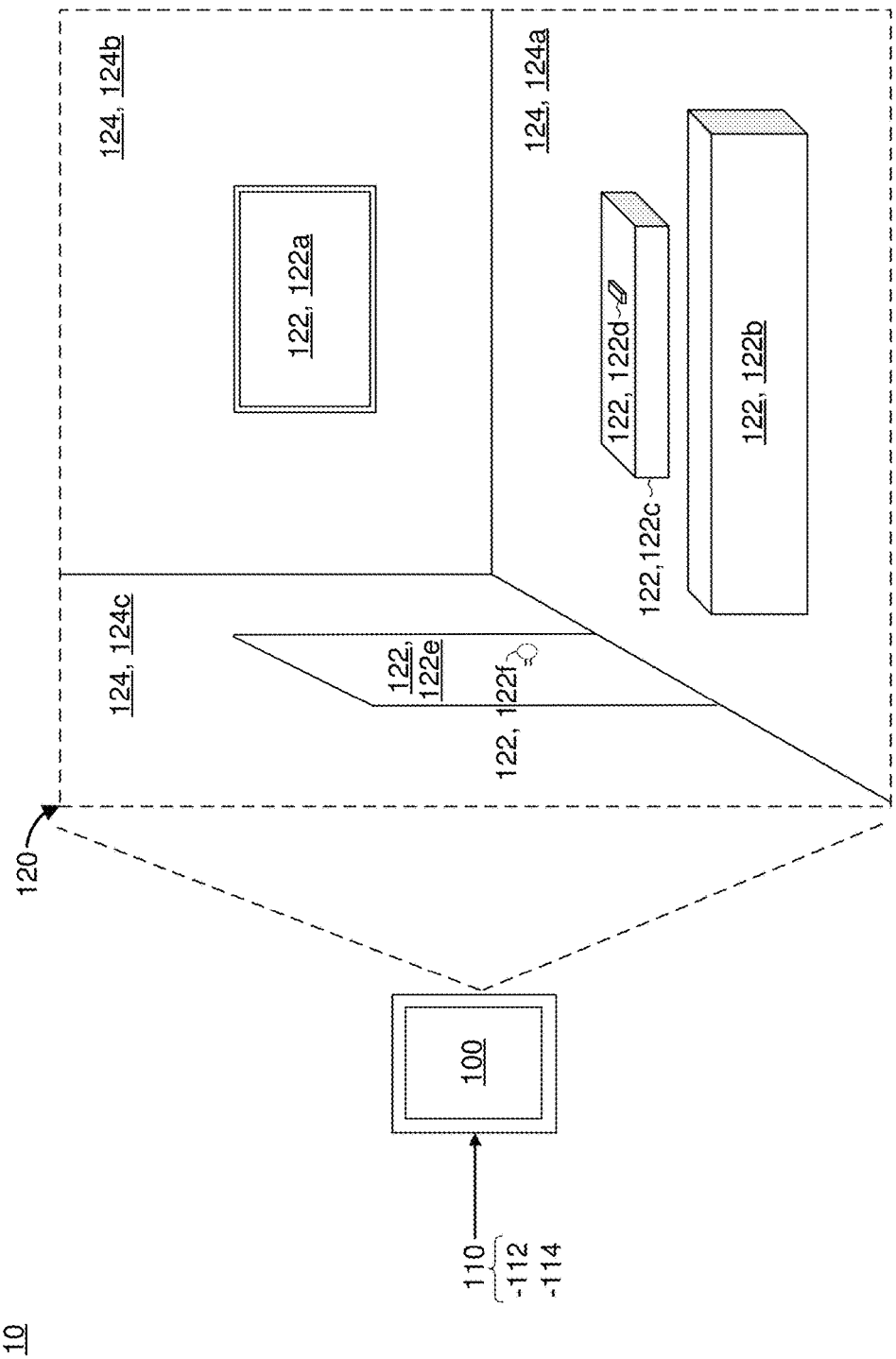

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating a perceptual property vector for a graphical object. In various implementations, a device includes a non-transitory memory and one or more processors coupled with the non-transitory memory. In some implementations, a method includes obtaining a semantic construction of a physical environment. In some implementations, the semantic construction of the physical environment includes a representation of a physical element and a semantic label for the physical element. In some implementations, the method includes obtaining a graphical representation of the physical element. In some implementations, the method includes synthesizing a perceptual property vector (PPV) for the graphical representation of the physical element based on the semantic label for the physical element. In some implementations, the PPV includes one or more perceptual characteristic values characterizing the graphical representation of the physical element. In some implementations, the method includes compositing an affordance in association with the graphical representation of the physical element. In some implementations, the affordance allows a graphical object to interact with the graphical representation of the physical element in accordance with the perceptual characteristic values included in the PPV.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The present disclosure provides methods, systems, and/or devices for generating a perceptual property vector (PPV) for a graphical representation of a physical element. The PPV includes various perceptual characteristic values that characterize the graphical representation of the physical element. The perceptual characteristic values indicate how graphical objects instantiated in a graphical environment can detect and interact with the graphical representation of the physical element. An affordance is composited in association with the graphical representation of the physical element. The affordance allows interaction with the graphical representation of the physical element in accordance with the perceptual characteristic values included in the PPV. Hereinafter, graphical environments are referred to as XR environments, graphical objects are referred to as XR objects and graphical representations are referred to as XR representations for the sake of brevity.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 100.

In the example of FIG. 1A, the electronic device 100 is held by a user (not shown). In some implementations, the electronic device 100 includes a smartphone, a tablet, a laptop, or the like. In some implementations, the electronic device 100 includes a wearable computing device that is worn by the user. For example, in some implementations, the electronic device 100 includes a head-mountable device (HMD). In some implementations, the HMD is shaped to form a receptacle that receives a device with a display (e.g., the device with the display can be slid into the HMD to serve as a display for the HMD). Alternatively, in some implementations, the HMD includes an integrated display.

In various implementations, the electronic device 100 obtains a semantic construction 110 of a physical environment, and synthesizes an XR environment 120 based on the semantic construction 110. In some implementations, the semantic construction 110 includes physical element representations 112 that represent physical elements in the physical environment. In some implementations, the semantic construction 110 includes semantic labels 114 for the physical elements. Since the electronic device 100 synthesizes the XR environment 120 based on the semantic construction 110 of the physical environment, the XR environment 120 is within a degree of similarity to the physical environment.

In some implementations, the physical element representations 112 represent physical elements that are located within the physical environment that the semantic construction 110 represents. For example, the physical element representations 112 represent real objects such as a television, a couch, a coffee table, etc. In some implementations, the physical element representations 112 represent bounding surfaces of the physical environment (e.g., a floor, walls and/or a ceiling of the physical environment).

In some implementations, the semantic labels 114 for the physical elements include information regarding the physical elements that are located within the physical environment that the semantic construction 110 represents. In some implementations, the semantic labels 114 indicate types of corresponding physical elements (e.g., a semantic label indicates that a corresponding physical element is a couch). In some implementations, the semantic labels 114 indicate various physical properties of their corresponding physical elements (e.g., a semantic label indicates a color, a texture, a material, etc. for the couch).

In the example of FIG. 1A, the XR environment 120 includes XR representations of physical elements 122 and XR representations of bounding surfaces 124. In various implementations, the electronic device 100 generates the XR representations of physical elements 122 and the XR representations of bounding surfaces 124 based on the physical element representations 112 and the semantic labels 114 included in the semantic construction 110 of the physical environment. In some implementations, the XR representations of physical elements 122 and/or the XR representations of bounding surfaces 124 are referred to as XR objects.

In the example of FIG. 1A, the XR environment 120 includes an XR television 122a that represents a real television identified by one of the physical element representations 112 included in the semantic construction 110. In the example of FIG. 1A, the XR environment 120 also includes an XR couch 122b, an XR coffee table 122c, an XR television remote 122d, an XR door 122e and an XR door handle 122f that represent a real couch, a real coffee table, a real television remote, a real door and a real door handle, respectively, located in the physical environment represented by the semantic construction 110.

In various implementations, XR properties of the XR representations of physical elements 122 are within a degree of similarity to physical properties of corresponding physical elements located in the physical environment that the semantic construction 110 represents. In some implementations, visual properties of the XR representations of physical elements 122 are selected to match visual properties of the corresponding physical elements located in the physical environment. For example, a color of the XR couch 122*b* is within a degree of similarity to a color of the corresponding real couch. Similarly, a texture of the XR coffee table 122*c* is within a degree of similarity to a texture of the corresponding real coffee table.

In the example of FIG. 1A, the XR representations of bounding surfaces 124 include an XR floor 124*a* that represents a real floor identified by one of the physical element representations 112 included in the semantic construction 110. The XR representations of bounding surfaces 124 also include an XR front wall 124*b* and an XR side wall 124*c* that represent a real front wall and a real side wall, respectively, of the physical environment represented by the semantic construction 110. The XR representations of bounding surfaces 124 are within a degree of similarity to physical bounding surfaces in the physical environment.

Referring to FIG. 1B, in various implementations, the electronic device 100 synthesizes respective perceptual property vectors (PPVs) 130 for the XR representations of physical elements 122 and the XR representations of bounding surfaces 124. In various implementations, each PPV 130 includes one or more perceptual characteristic values 132 characterizing a corresponding XR representation of physical element. For example, the PPVs 130 include a first PPV which includes a first set of perceptual characteristic values that characterize the XR television 122*a* (e.g., the first set of perceptual characteristic values indicate a size of the XR television 122*a*, a resolution of the XR television 122*a*, a refresh rate of the XR television 122*a*, etc.). Similarly, the PPVs 130 include a second PPV which includes a second set of perceptual characteristic values that characterize the XR couch 122*b* (e.g., the second set of perceptual characteristic values indicate a size, a color, a texture and/or a material of the XR couch 122*b*).

In various implementations, the perceptual characteristic values 132 characterize one or more physical properties of the XR representation of the physical element. In some implementations, the perceptual characteristic values 132 characterize a texture of the XR representation. For example, the perceptual characteristic values 132 for an XR representation indicate whether the XR representation appears smooth or rough when touched by an XR object such as an XR representation of a human operator, an objective-effectuator or a virtual intelligent agent (VIA).

In some implementations, the perceptual characteristic values 132 characterize a hardness of the XR representation of the physical element. For example, the perceptual characteristic values 132 for the XR couch 122*b* characterize a hardness of an arm rest and/or a hardness of a cushion of the XR couch 122*b*. As another example, the perceptual characteristic values 132 for the XR floor 124*a* characterize a hardness of the XR floor 124*a*, which determines the result of dropping an XR object on the XR floor 124*a*. For example, if the perceptual characteristic values 132 for the XR floor 124*a* indicate that the XR floor 124*a* is as hard as concrete then dropping a delicate XR object such as a glass may result in the XR object breaking. However, if the perceptual characteristic values 132 for the XR floor 124*a* indicate that the XR floor 124*a* is as soft as carpet then dropping the delicate XR object may result in the XR object staying intact.

In various implementations, the perceptual characteristic values 132 characterize a smell of the XR representation of the physical element. For example, in some implementations, the perceptual characteristic values 132 define an odor function for the XR representation of the physical element. As an example, the perceptual characteristic values 132 for the XR couch 122*b* characterize how the XR couch 122*b* smells to an XR object such as an XR dog or an XR human. In some implementations, an odor function for an XR representation of a physical element defines a degree of the smell (e.g., a strength of the smell) as a function of a distance from the XR representation of the physical element.

In some implementations, the electronic device 100 generates the PPVs 130 (e.g., the perceptual characteristic values 132 in the PPVs 130) based on the information included in the semantic construction 110. In some implementations, the electronic device 100 generates the PPVs 130 based on the semantic labels 114 included in the semantic construction 110. For example, in some implementations, the electronic device 100 obtains (e.g., retrieves) the perceptual characteristic values 132 based on the semantic labels 114, and utilizes the perceptual characteristic values 132 to synthesize the PPVs 130. In some implementations, the electronic device 100 generates a search query that includes the semantic labels 114 as search terms, performs a search by submitting the search query to a search engine, and receives the perceptual characteristic values 132 as search results.

Figure 1C:
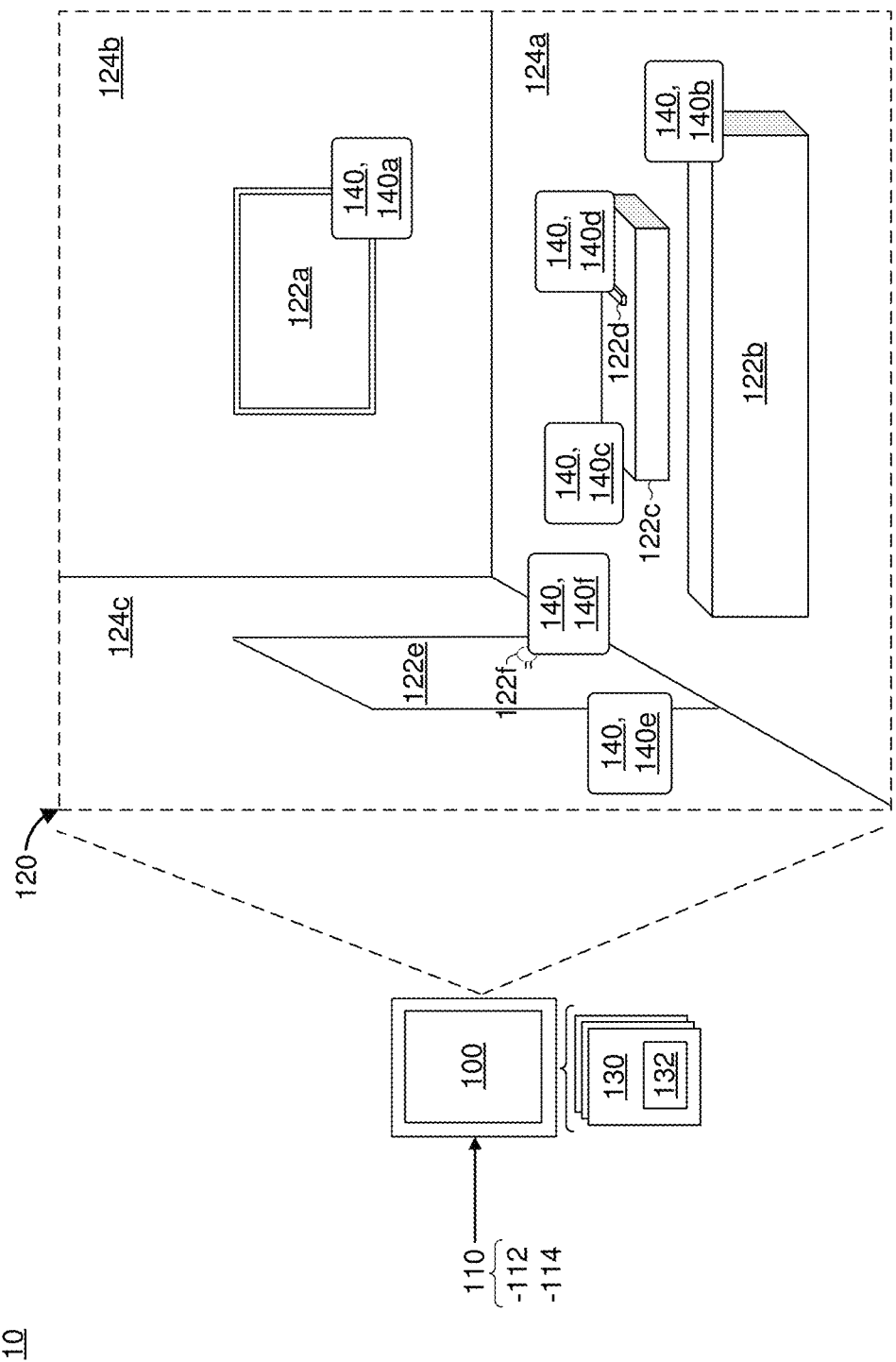

Referring to FIG. 1C, in various implementations, the electronic device 100 composites respective affordances 140 in association with the XR representations of physical elements 122. For example, the electronic device 100 composites a television affordance 140*a* in association with the XR television 122*a*, a couch affordance 140*b* in association with the XR couch 122*b*, a coffee table affordance 140*c* in association with the XR coffee table 122*c*, a television remote affordance 140*d* in association with the XR television remote 122*d*, a door affordance 140*e* in association with the XR door 122*e*, and a door handle affordance 140*f* in association with the XR door handle 122*f*.

In various implementations, the affordances 140 allow interaction with the corresponding XR representation of physical elements 122 in accordance with the perceptual characteristic values 132 included in their corresponding PPVs 130. For example, the television affordance 140*a* allows interaction with the XR television 122*a* in accordance with the perceptual characteristic values 132 included in the PPV 130 for the XR television 122*a* (e.g., an XR representation of a character objective-effectuator can activate the television affordance 140*a* to turn the XR television 122*a* ON or OFF). Similarly, the door handle affordance 140*f* allows interaction with the XR door handle 122*f* in accordance with the perceptual characteristic values 132 included in the PPV 130 for the XR door handle 122*f* (e.g., an XR representation of a VIA can invoke the door handle affordance 140*f* to turn the XR door handle 122*0*.

Figure 1D:
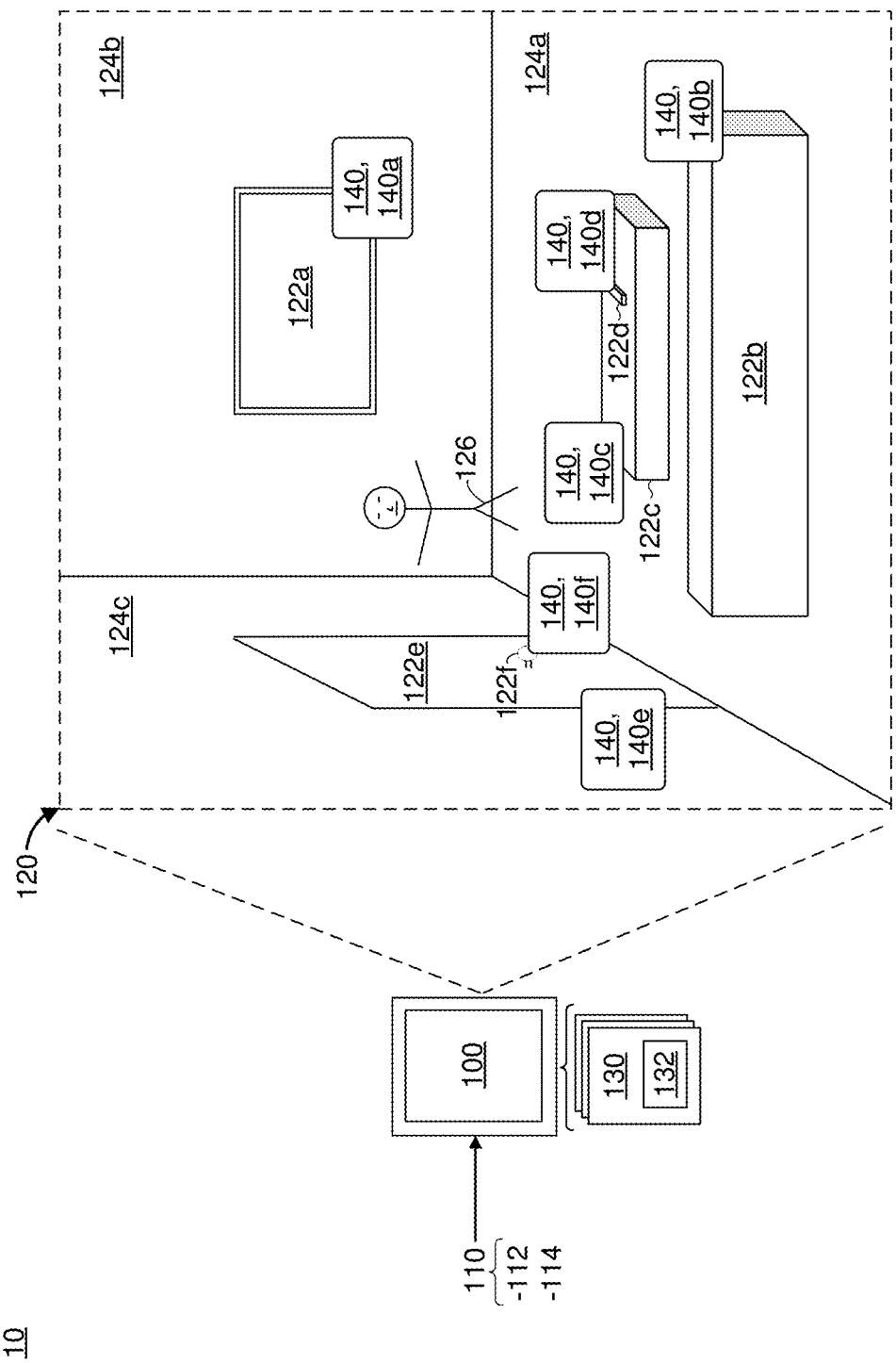

Referring to FIG. 1D, in some implementations, an XR person 126 can activate the one or more of the affordances 140 to interact with the corresponding XR representation of the physical element 122. For example, the XR person 126 can move closer to the door handle affordance 140*f* and activate the door handle affordance 140*f* in order to turn the XR door handle 122*f* which can result in opening/closing of the XR door 122e. Similarly, the XR person 126 can move closer to the television remote affordance 140d and activate the television remote affordance 140d in order to pick-up the XR television remote 122d. After picking-up the television remote affordance 140d, the XR person 126 can activate the television remote affordance 140d again in order to operate the XR television 122a via the XR television remote 122d. In some implementations, the XR person 126 is an XR representation of an objective-effectuator (e.g., a character objective-effectuator). In some implementations, the XR person 126 is an XR representation of a person operating the electronic device 100 (e.g., a user of the electronic device 100). In some implementations, the XR person 126 is an XR representation of a VIA.

In some implementations, a head-mountable device (HMD) (not shown), being worn by a user 50, presents (e.g., displays) the XR environment 120 according to various implementations. In some implementations, the HMD includes an integrated display (e.g., a built-in display) that displays the XR environment 120. In some implementations, the HMD includes a head-mountable enclosure. In various implementations, the head-mountable enclosure includes an attachment region to which another device with a display can be attached. For example, in some implementations, the electronic device 100 can be attached to the head-mountable enclosure. In various implementations, the head-mountable enclosure is shaped to form a receptacle for receiving another device that includes a display (e.g., the electronic device 100). For example, in some implementations, the electronic device 100 slides/snaps into or otherwise attaches to the head-mountable enclosure. In some implementations, the display of the device attached to the head-mountable enclosure presents (e.g., displays) the XR environment 120.

Figure 2:
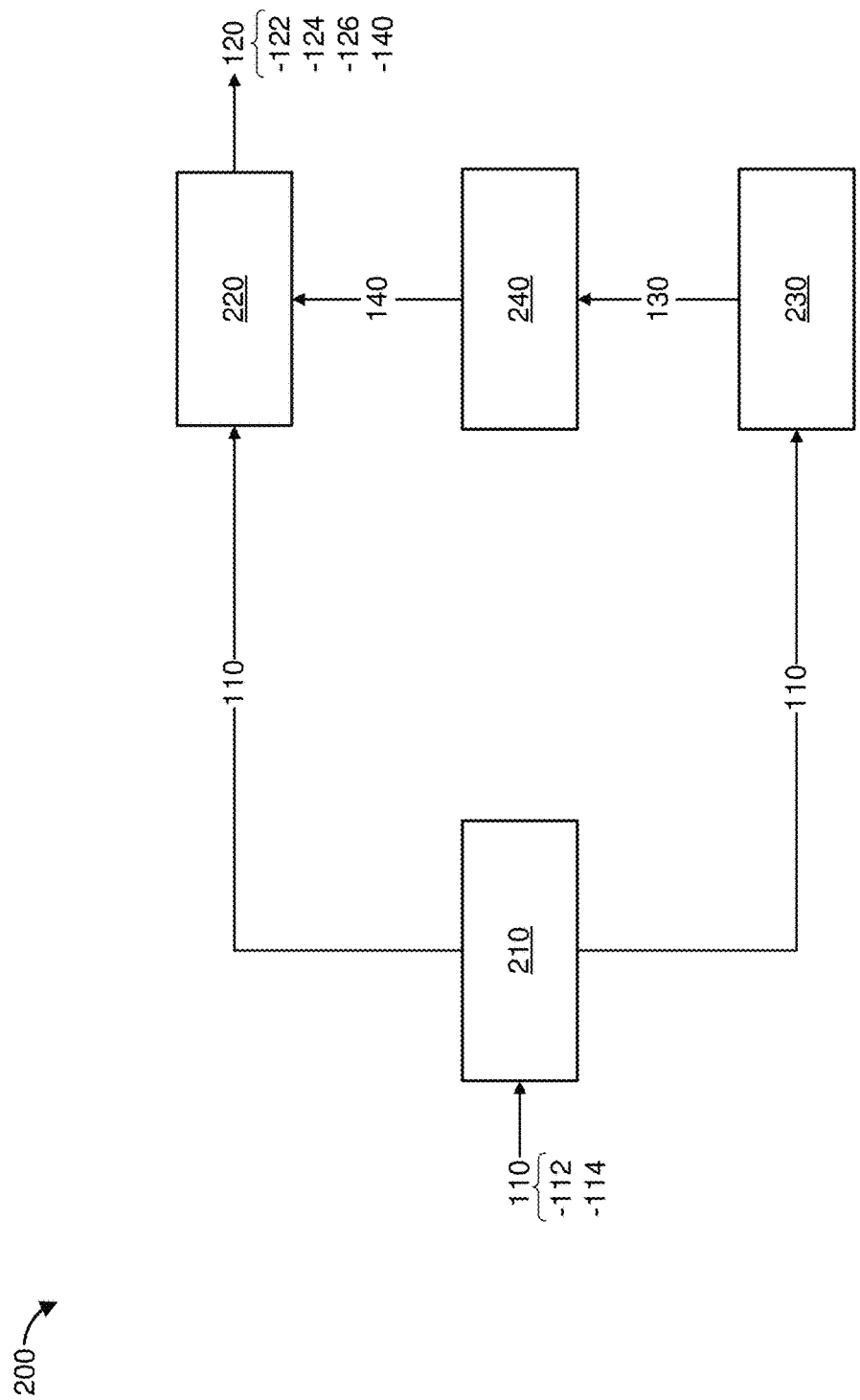
FIG. 2 is a block diagram of an example device in accordance with some implementations.

FIG. 2 illustrates a block diagram of an electronic device 200. In some implementations, the electronic device 200 implements the electronic device 100 shown in FIGS. 1A-1D. As illustrated in FIG. 2, in some implementations, the electronic device 200 includes a data obtainer 210, an XR synthesizer 220, a PPV synthesizer 230, and an affordance compositor 240.

In various implementations, the data obtainer 210 obtains the semantic construction 110 of a physical environment. In some implementations, the data obtainer 210 obtains the semantic construction 110 by retrieving the semantic construction 110 from a data store. In some implementations, the data obtainer 210 obtains the semantic construction 110 by receiving the semantic construction 110 from another device that generated the semantic construction 110. In some implementations, the data obtainer 210 generates the semantic construction 110. In some implementations, the data obtainer 210 sends the semantic construction 110 to the XR synthesizer 220 and the PPV synthesizer 230.

In various implementations, the XR synthesizer 220 synthesizes an XR environment (e.g., the XR environment 120 shown in FIGS. 1A-1D) based on the semantic construction 110 of the physical environment. As described herein, the XR environment 120 includes XR representations of physical elements 122, and XR representations of bounding surfaces 124. In some implementations, the XR synthesizer 220 instantiates one or more objective-effectuators in the XR environment 120. In such implementations, the XR environment 120 includes XR representations of the objective-effectuators instantiated in the XR environment 120 (e.g., the XR environment 120 includes the XR person 126 shown in FIG. 1D). In some implementations, the XR synthesizer 220 instantiates a VIA in the XR environment 120. In such implementations, the XR environment 120 includes an XR representation of the VIA (e.g., the XR person 126 shown in FIG. 1D).

In some implementations, the PPV synthesizer 230 synthesizes the PPVs 130 for the XR representations of physical elements 122 in the XR environment 120. In some implementations, the PPV synthesizer 230 synthesizes the PPVs 130 based on the semantic labels 114 included in the semantic construction 110. For example, in some implementations, the PPV synthesizer 230 determines perceptual characteristic values (e.g., the perceptual characteristic values 132 shown in FIG. 1B), and utilizes the perceptual characteristic values to synthesize the PPVs 130. In some implementations, the PPV synthesizer 230 computes the perceptual characteristic values for the PPVs 130 based on the physical properties indicated by the semantic labels 114. In some implementations, the PPV synthesizer 230 obtains the perceptual characteristic values by performing a search that uses the semantic labels 114 as search terms, and receives the perceptual characteristic values as search results. In some implementations, the PPV synthesizer 230 provides the PPVs 130 to the affordance compositor 240.

In various implementations, the affordance compositor 240 composites the affordances 140 within the XR environment 120. As described herein, in some implementations, the affordance compositor 240 composites the affordances 140 in association with corresponding XR representations of physical elements 122. For example, as shown in FIG. 1C, in some implementations, the affordance compositor 240 composites the television affordance 140a adjacent to the XR television 122a. More generally, in some implementations, the affordance compositor 240 composites the affordances 140 adjacent to the XR representations of the physical elements 122. In some implementations, the affordances 140 composited by the affordance compositor 240 are invisible. However, in such implementations, the affordances 140 can still be detected by XR objects such as the XR person 126. As such, in some implementations, compositing the affordances 140 does not reduce a degree of similarity between the XR environment 120 and the physical environment that the XR environment 120 corresponds to.

Figure 3A:
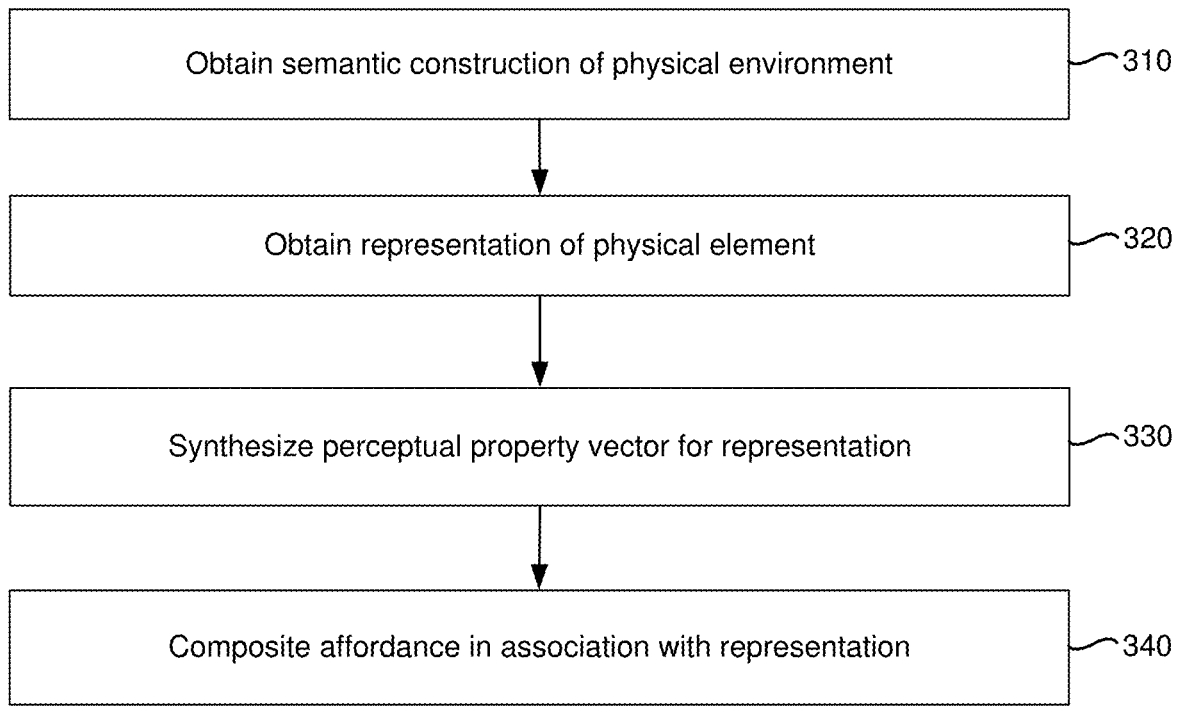
FIGS. 3A-3B are flowchart representations of a method of generating a perceptual property vector in accordance with some implementations.

FIG. 3A is a flowchart representation of a method 300 of generating a PPV in accordance with some implementations. In various implementations, the method 300 is performed by a device with a non-transitory memory and one or more processors coupled with the non-transitory memory (e.g., the electronic device 100 shown in FIGS. 1A-1D and/or the electronic device 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in some implementations, the method 300 includes obtaining a semantic construction of a physical environment. For example, the method 300 includes obtaining the semantic construction 110 shown in FIGS. 1A-2. In some implementations, the method 300 includes receiving the semantic construction from another device that generated the semantic construction. In some implementations, the method 300 includes retrieving the semantic construction (e.g., from the non-transitory memory, or a remote data store). In some implementations, the semantic construction of the physical environment includes a representation of a physical element. For example, the semantic construction 110 includes the physical element representations 112 shown in FIGS. 1A-2. In some implementations, the semantic construction includes a semantic label for the physical element. For example, the semantic construction 110 includes the semantic labels 114 shown in FIGS. 1A-2.

As represented by block 320, in some implementations, the method 300 includes obtaining an XR representation of the physical element. In some implementations, the method 300 includes retrieving the XR representation of the physical element from the non-transitory memory or a remote data store. In some implementations, the method 300 includes generating the XR representation of the physical element based on the information included in the semantic construction (e.g., based on the representation of the physical element and the semantic label for the physical element). In some implementations, the method 300 includes receiving the XR representation of the physical element from another device.

As represented by block 330, in some implementations, the method 300 includes synthesizing a PPV for the XR representation of the physical element based on the semantic label for the physical element. For example, synthesizing the PPVs 130 based on the semantic labels 114 shown in FIG. 1B. In some implementations, the PPV includes one or more perceptual characteristic values characterizing the XR representation of the physical element. For example, the PPVs 130 include one or more perceptual characteristic values 132 shown in FIG. 1B.

As represented by block 340, in some implementations, the method 300 includes compositing an affordance in association with the XR representation of the physical element. For example, compositing the affordances 140 in association with the XR representations shown in FIG. 1C. In some implementations, the affordance allows an XR object (e.g., a virtual object such as a virtual dog) to interact with the XR representation of the physical element in accordance with the perceptual characteristic values included in the PPV. For example, the affordances 140 allow the XR person 126 to interact with the XR representations of physical elements 122. As another example, the affordance allows a virtual dog to smell an XR representation of a dog bone.

Figure 3B:
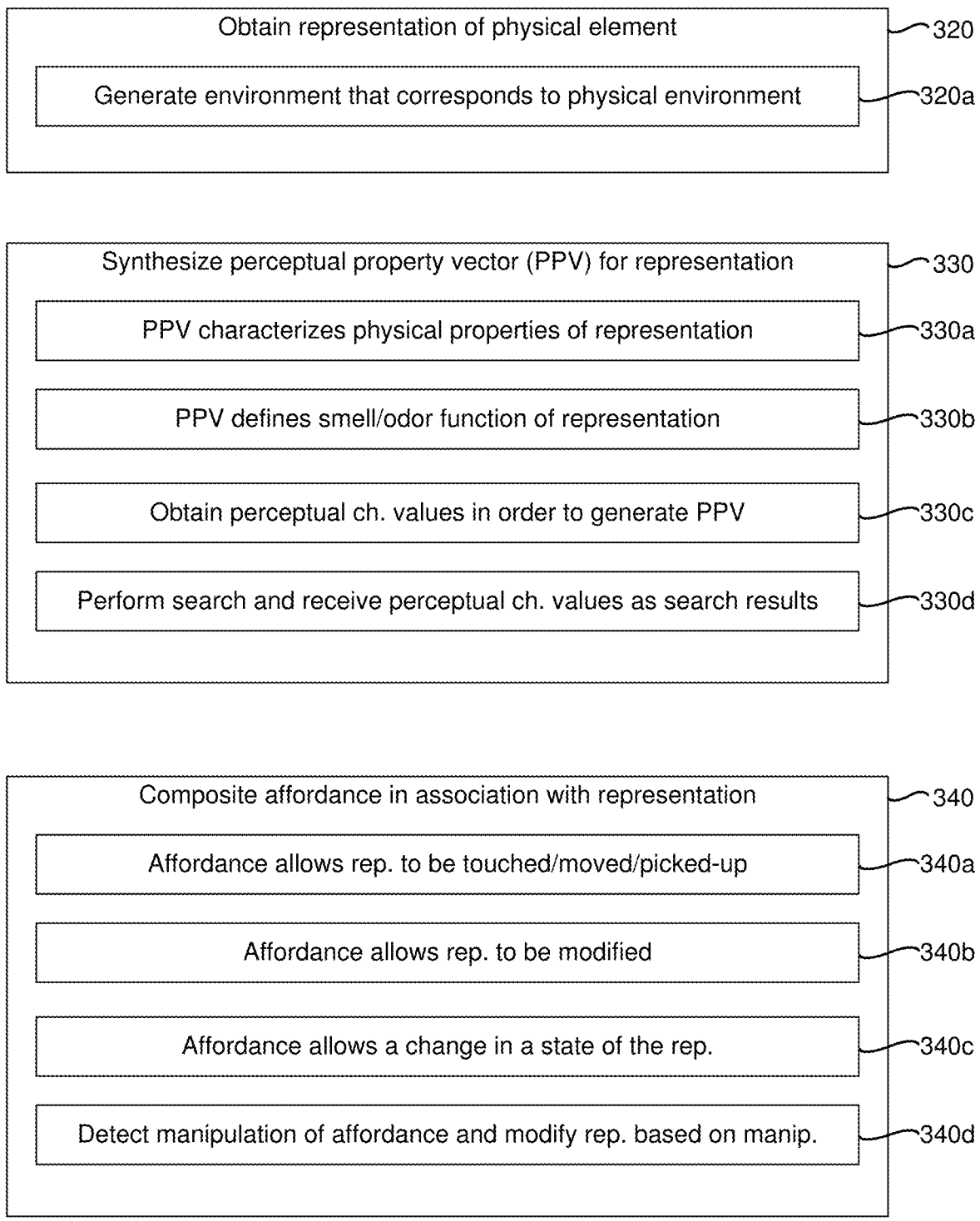

Referring to FIG. 3B, as represented by block 320a, in some implementations, the method 300 includes generating an XR environment that corresponds to the physical environment based on the semantic construction of the physical environment. In such implementations, the XR environment includes the XR representation of the physical element. For example, generating the XR environment 120 (shown in FIG. 1A) that includes the XR representations of physical elements 122.

As represented by block 330a, in some implementations, the one or more perceptual characteristic values characterize one or more physical properties of the XR representation of the physical element. For example, the perceptual characteristic values characterize a color, a size, a material type, a texture and/or a hardness of the XR representation of the physical element.

As represented by block 330b, in some implementations, the one or more perceptual characteristic values characterize a smell of the XR representation of the physical element. For example, in some implementations, the one or more perceptual characteristic values define an odor function for the XR representation of the physical element. In some implementations, the odor function defines distances from which different types of objective-effectuators can detect the XR representations of the physical element. For example, the odor function defines how far an XR dog can smell an XR dog bone from. As another example, the odor function defines a first distance from which an XR dog can smell an XR bacon bit, and a second distance from which an XR human can smell the XR bacon bit.

As represented by block 330c, in some implementations, the method 300 includes obtaining the one or more perceptual characteristic values based on the semantic label, and utilizing the perceptual characteristic values to synthesize the PPV. For example, in some implementations, the semantic label indicates a type of the physical element. In such implementations, the method 300 includes obtaining real properties that are typically associated with the type of the physical element, and setting the perceptual characteristic values to correspond to the real properties. For example, setting perceptual characteristic values to indicate XR properties that are within a degree of similarity to the real properties of the physical element.

As represented by block 330d, in some implementations, the method 300 includes performing a search based on the semantic label, and receiving the one or more perceptual characteristic values as search results. For example, in some implementations, the method 300 includes using the semantic label as search terms, inputting the search terms into a search engine, and receiving the perceptual characteristic values as search results from the search engine.

In some implementations, the method 300 includes retrieving the one or more perceptual characteristic values from a library that maps types of physical elements to specific perceptual characteristic values.

As represented by block 340a, in some implementations, the affordance allows the XR representation of the physical element to be touched by an XR object. For example, the XR object (e.g., an XR representation of an objective-effectuator, an XR representation of a VIA or an XR representation of a person, for example, the XR person 126 shown in FIG. 1D) can activate the television affordance 140a to touch the XR television 122a.

In some implementations, the affordance allows the XR representation of the physical element to be moved by an XR object. For example, the XR object (e.g., an XR representation of an objective-effectuator, an XR representation of a VIA or an XR representation of a person, for example, the XR person 126 shown in FIG. 1D) can activate the door affordance 140e to move the XR door 122e (e.g., between an open and a closed position).

In some implementations, the affordance allows the XR representation of the physical element to be picked-up by an XR object. For example, the XR object (e.g., an XR representation of an objective-effectuator, an XR representation of a VIA or an XR representation of a person, for example, the XR person 126 shown in FIG. 1D) can activate the television remote affordance 140d to pick-up the XR television remote 122d.

As represented by block 340b, in some implementations, the affordance allows the XR representation of the physical element to be modified (e.g., broken) by an XR object. In some implementations, the XR object can activate an affordance to throw a corresponding XR representation of a physical element causing the XR representation of the physical element to break. For example, the XR object (e.g., an XR representation of an objective-effectuator, an XR representation of a VIA or an XR representation of a person, for example, the XR person 126 shown in FIG. 1D) can activate the television remote affordance 140d to throw the XR television remote 122d at the XR television 122a causing the XR television 122a to break.

In some implementations, the affordance allows the XR representation of the physical element to cease displaying. For example, if the XR representation is an XR dog treat, then an XR dog can eat the XR dog treat and cause the XR dog treat to cease displaying. In some implementations, the affordance allows the XR representation of the physical element to be hidden from view (e.g., by covering it up).

As represented by block 340c, in some implementations, the affordance allows a change in a state of the XR representation of the physical element by an XR object. For example, upon activation, the door affordance 140e and/or the door handle affordance 140f allow the XR door 122e to move between an open state and a closed state. Similarly, upon being activated, the television affordance 140a and/or the television remote affordance 140d allow the XR television 122a to switch between an ON state and an OFF state.

As represented by block 340d, in some implementations, the method 300 includes detecting a manipulation of the affordance, and modifying the XR representation of the physical element based on the manipulation of the affordance. For example, detecting that the XR person 126 has activated the door handle affordance 140f, and displaying a movement (e.g., a rotation) of the XR door handle 122f.

Figure 4:
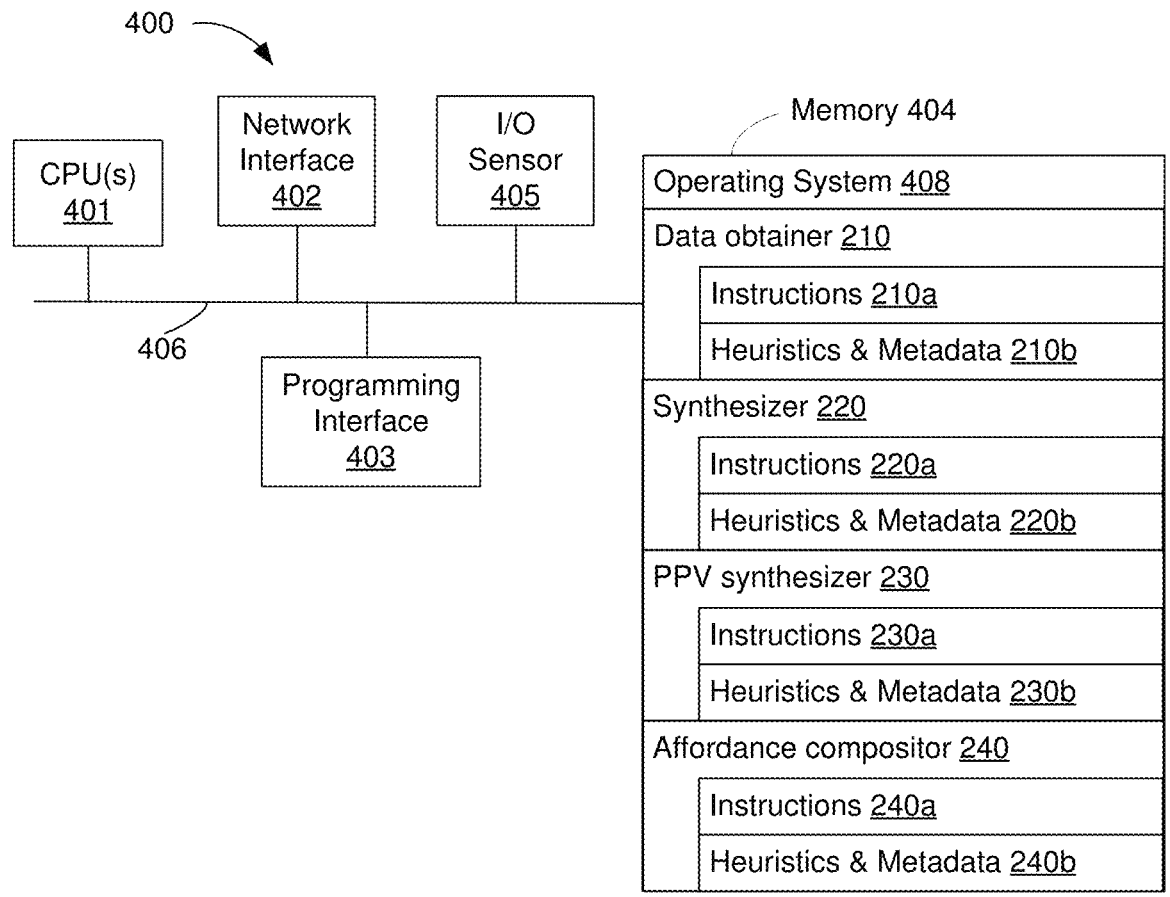
FIG. 4 is a block diagram of a device enabled with various components that generate a perceptual property vector in accordance with some implementations.

FIG. 4 is a block diagram of a device 400 (e.g., the electronic device 100 shown in FIGS. 1A-1D and/or the electronic device 200 shown in FIG. 2) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, input/output (I/O) sensors 405 and one or more communication buses 406 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 406 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the I/O sensor 405 includes an image sensor (e.g., a camera) that captures images and/or videos of a physical environment. In some implementations, the I/O sensor 405 includes a depth sensor that captures depth data for a physical environment.

In some implementations, the memory 404 or the non-transitory computer readable storage medium of the memory 404 stores the following programs, modules and data structures, or a subset thereof including an optional operating system 408, the data obtainer 210, the XR synthesizer 220, the PPV synthesizer 230, and the affordance compositor 240. As described herein, in various implementations, the data obtainer 210 obtains a semantic construction of a physical environment. To that end, the data obtainer 210 includes instructions 210a, and heuristics and metadata 210b. As described herein, in various implementations, the XR synthesizer 220 obtains an XR representation of a physical element. To that end, the XR synthesizer 220 includes instructions 220a, and heuristics and metadata 220b. As described herein, in various implementations, the PPV synthesizer 230 synthesizes a PPV for the XR representation of the physical element. To that end, the PPV synthesizer 230 includes instructions 230a, and heuristics and metadata 230b. As described herein, in various implementations, the affordance compositor 240 composites an affordance with the XR representation of the physical element. To that end, the affordance compositor 240 includes instructions 240a, and heuristics and metadata 240b.

In various implementations, an XR representation of a virtual intelligent agent (VIA) performs an action in order to satisfy (e.g., complete or achieve) an objective of the VIA. In some implementations, the VIA obtains the objective from a human operator (e.g., a user of a device). In some implementations, an XR representation of the VIA (e.g., an XR object representing the VIA) obtains the objective from an XR representation of the human operator. For example, the XR representation of the human operator instructs the XR representation of the VIA to perform an action in the XR environment. As such, in some implementations, the VIA performs the action by manipulating the XR representation of the VIA in the XR environment. In some implementations, the XR representation of the VIA is able to perform XR actions that the XR representation of the human operator is incapable of performing. In some implementations, the XR representation of the VIA performs XR actions based on information that the VIA obtains from a physical environment. For example, the XR representation of the VIA nudges the XR representation of the human operator when the VIA detects ringing of a doorbell in the physical environment.

In various implementations, an XR representation of an objective-effectuator performs an action in order to satisfy (e.g., complete or achieve) an objective of the objective-effectuator. In some implementations, an objective-effectuator is associated with a particular objective, and the XR representation of the objective-effectuator performs actions that improve the likelihood of satisfying that particular objective. In some implementations, XR representations of the objective-effectuators are referred to as object representations, for example, because the XR representations of the objective-effectuators represent various objects (e.g., real objects, or fictional objects). In some implementations, an objective-effectuator representing a character is referred to as a character objective-effectuator. In some implementations, a character objective-effectuator performs actions to effectuate a character objective. In some implementations, an objective-effectuator representing an equipment is referred to as an equipment objective-effectuator. In some implementations, an equipment objective-effectuator performs actions to effectuate an equipment objective. In some implementations, an objective effectuator representing an environment is referred to as an environmental objective-effectuator. In some implementations, an environmental objective effectuator performs environmental actions to effectuate an environmental objective.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a non-transitory memory and one or more processors coupled with the non-transitory memory:
   obtaining a semantic construction of a physical environment, wherein the semantic construction of the physical environment includes a representation of a physical element and a semantic label for the physical element;
   obtaining a graphical representation of the physical element;
   determining, based on the semantic label for the physical element, one or more perceptual characteristic values that indicate how a virtual object can detect and interact with the graphical representation of the physical element; and
   compositing an affordance in association with the graphical representation of the physical element, wherein the affordance allows the virtual object to interact with the graphical representation of the physical element in accordance with the one or more perceptual characteristic values.

2. The method of claim 1, wherein the one or more perceptual characteristic values characterize one or more physical properties of the graphical representation of the physical element.

3. The method of claim 1, wherein the one or more perceptual characteristic values characterize a texture of the graphical representation of the physical element.

4. The method of claim 1, wherein the one or more perceptual characteristic values characterize a hardness of the graphical representation of the physical element.

5. The method of claim 1, wherein the one or more perceptual characteristic values characterize a smell of the graphical representation of the physical element.

6. The method of claim 1, wherein the one or more perceptual characteristic values define an odor function for the graphical representation of the physical element.

7. The method of claim 1, wherein determining the one or more perceptual characteristic values comprises:
   performing a search based on the semantic label; and
   receiving the one or more perceptual characteristic values as search results.

8. The method of claim 1, wherein the affordance allows the graphical representation of the physical element to be touched by the virtual object.

9. The method of claim 1, wherein the affordance allows the graphical representation of the physical element to be moved by the virtual object.

10. The method of claim 1, wherein the affordance allows the graphical representation of the physical element to be picked-up by the virtual object.

11. The method of claim 1, wherein the affordance allows the graphical representation of the physical element to be modified by the virtual object.

12. The method of claim 1, wherein the affordance allows the graphical representation of the physical element to be broken by the virtual object.

13. The method of claim 1, wherein the affordance allows the graphical representation of the physical element to cease displaying by the virtual object.

14. The method of claim 1, wherein the affordance allows a change in a state of the graphical representation of the physical element by the virtual object.

15. The method of claim 1, wherein the virtual object comprises a virtual representation of an objective-effectuator.

16. The method of claim 1, wherein the virtual object comprises a virtual representation of an intelligent agent.

17. The method of claim 1, wherein the virtual object comprises a virtual representation of a person operating the device.

18. The method of claim 1, further comprising:
   detecting a manipulation of the affordance; and
   modifying the graphical representation of the physical element based on the manipulation of the affordance.

19. A device comprising:
   one or more processors;
   a non-transitory memory;
   one or more displays; and
   one or more programs stored in the non-transitory memory, which, when executed by the one or more processors, cause the device to:
   obtain a semantic construction of a physical environment, wherein the semantic construction of the physical environment includes a representation of a physical element and a semantic label for the physical element;

obtain a graphical representation of the physical element;

determine, based on the semantic label for the physical element, one or more perceptual characteristic values that indicate how a virtual object can detect and interact with the graphical representation of the physical element; and composite an affordance in association with the graphical representation of the physical element, wherein the affordance allows the virtual object to interact with the graphical representation of the physical element in accordance with the one or more perceptual characteristic values.

20. The device of claim 19, wherein the one or more perceptual characteristic values characterize a smell of the graphical representation of the physical element.

21. The device of claim 19, wherein the affordance allows the graphical representation of the physical element to be touched by the virtual object.

22. A non-transitory memory storing one or more programs, which, when executed by one or more processors of a device with a display, cause the device to:

obtain a semantic construction of a physical environment, wherein the semantic construction of the physical environment includes a representation of a physical element and a semantic label for the physical element;

obtain a graphical representation of the physical element;

determine, based on the semantic label for the physical element, one or more perceptual characteristic values that indicate how a virtual object can detect and interact with the graphical representation of the physical element; and composite an affordance in association with the graphical representation of the physical element, wherein the affordance allows the virtual object to interact with the graphical representation of the physical element in accordance with the one or more perceptual characteristic values.

23. The non-transitory memory of claim 22, wherein the one or more perceptual characteristic values define an odor function for the graphical representation of the physical element.

24. The non-transitory memory of claim 22, wherein the virtual object comprises a virtual representation of an intelligent agent.

25. The non-transitory memory of claim 22, wherein the one or more programs further cause the device to:

detect a manipulation of the affordance; and modify the graphical representation of the physical element based on the manipulation of the affordance.

\* \* \* \* \*